United States Patent
Yu et al.

(10) Patent No.: US 7,727,656 B2
(45) Date of Patent: Jun. 1, 2010

(54) WAVE-SHAPED FLOW BOARD OF FUEL CELLS

(75) Inventors: Su-Yun Yu, Tao-Yuan (TW); Chiang-Wen Lai, Taipei (TW); Yu-Chih Lin, Kao-Hsiung (TW); Jiun-Ming Chen, Taipei County (TW); Ching-Sen Yang, Taoyuan County (TW)

(73) Assignee: Nan Ya Printed Circuit Board Corporation, Luchu, Taoyuan (TW)

( * ) Notice: Subject to any disclaimer, the term of this patent is extended or adjusted under 35 U.S.C. 154(b) by 987 days.

(21) Appl. No.: 11/458,102

(22) Filed: Jul. 18, 2006

(65) Prior Publication Data
US 2007/0292741 A1    Dec. 20, 2007

(30) Foreign Application Priority Data
Jun. 16, 2006    (TW) .............................. 95121574 A

(51) Int. Cl.
*H01M 2/14* (2006.01)
(52) U.S. Cl. ............................. 429/34; 429/38; 428/182
(58) Field of Classification Search .................. 429/34, 429/38, 39; 428/182
See application file for complete search history.

(56) References Cited

U.S. PATENT DOCUMENTS

| 5,527,363 | A | * | 6/1996 | Wilkinson et al. | .......... 29/623.1 |
| 6,255,012 | B1 | * | 7/2001 | Wilson et al. | .................. 429/38 |
| 6,544,681 | B2 | * | 4/2003 | McLean et al. | ................ 429/39 |
| 2001/0036523 | A1 | * | 11/2001 | Sobolewski | ................ 428/36.9 |
| 2007/0134542 | A1 | | 6/2007 | Chang | |

FOREIGN PATENT DOCUMENTS

| CN | 1691394 A | 11/2005 |
| CN | 2775855 Y | 4/2006 |
| TW | I222765 | 10/2004 |
| TW | M291089 | 5/2006 |

* cited by examiner

*Primary Examiner*—Raymond Alejandro
(74) *Attorney, Agent, or Firm*—Winston Hsu

(57) ABSTRACT

A wave-shaped flow board suitable for a fuel cell includes an injection-molded body substrate, a reaction zone recessed into a surface of the body substrate, and a wave-shaped current collector, which defines a plurality of independent fuel channels. The wave-shaped current collector is integrally mounted in the reaction zone and comprises a bendable conductive lug portion for providing an electrical connection between the wave-shaped current collector and a circuit on the surface of the wave-shaped flow board.

5 Claims, 4 Drawing Sheets

WAVE-SHAPED FLOW BOARD OF FUEL CELLS

BACKGROUND OF THE INVENTION

1. Field of the Invention

The present invention relates to a flow board of a fuel cell and a manufacturing method thereof, and more particularly, to a flow board with high methanol resistance and high mechanical strength, superior fuel flow efficiency, and low cost.

2. Description of the Prior Art

As is well known, direct methanol fuel cells (DMFCs) are power packages that use diluted methanol liquid as fuel, and change chemical energy to electric power electro-chemically. Compared with previous power generating methods, DMFCs have the advantages of low pollution, low noise, high energy density, and higher energy exchange rates. DMFCs are a clean energy resource, and can be applied in family power generated systems, uninterruptible power systems, electric products, transport, military equipment, and the space industry.

The operating principle of DMFCs is oxidizing the methanol liquid in the anode catalyst layer to generate hydrogen ions ($H^+$), electrons ($e^-$), and carbon dioxide ($CO_2$). The hydrogen ions are input to the cathode by an electrolyte. At the same time, oxygen is supplied to the cathode, and the hydrogen ions and electrons in the cathode catalyst layer undergo a reduction reaction to generate water. In general, fuel cells are made from many basic units. Each basic unit provides low voltage so many basic units must connect in series to output a required operating voltage.

The DMFC module usually includes a current collector and a flow board, which both play important roles. The current collector collects the electrons generated from the electron-chemical reaction, and the flow board manages and controls the distribution of the fuel. In the past, the flow board design has focused on enabling fuel to pass smoothly through the fuel channel into the membrane electrode assembly (MEA).

The prior flow boards use graphite or glass fiberboard such as FR4, FR5 as the materials of the body substrates. The flow boards are conventionally made by using a computer numerical control (CNC) mill lathe. The shortcomings of CNC mill lathe include low yield, and high cost. The prior body substrates, which are made of graphite, FR4, or FR5, have poor mechanical properties, and occupy too much space. The above reasons are disadvantageous for the yield and popularization of the fuel cell.

In conclusion, a well designed flow board does not only depend on choosing a material that is resistive to corrosion caused by gaseous/liquid fuel and/or the chemical reactant, but also requires choosing a material that has superior mechanical properties, low cost, and fast mass production. There is a need to improve both the materials and the manufacturing methods utilized in conventional flow boards.

SUMMARY OF THE INVENTION

In view of the above reasons, the main objective of the present invention is to provide an improved flow board and corresponding manufacturing method to overcome the shortcomings of the prior art.

The present invention provides a wave-shaped flow board suitable for a fuel cell. It includes a body substrate formed by an injection molding method, which is made from a macromolecular substance that can be molded by the injection molding method. It further comprises at least a wave-shaped reaction zone, which defines a plurality of independent fuel channels on a surface of the body substrate. The wave-shaped flow board and a membrane electrode assembly (MEA) are affixed, so as fuel flows into the fuel channel, a catalytic reaction occurs for generating electric current.

The present invention provides a wave-shaped flow board suitable for a fuel cell. It includes a body substrate being formed by an injection molding method, which is made from a macromolecular substance that can be molded by the injection molding method. It further comprises at least a reaction zone deposited on the surface of the body substrate, and at least a wave-shaped current collector, which defines a plurality of independent fuel channels fixed in the reaction zone. The flow board and a membrane electrode assembly (MEA) are affixed, so as fuel flows into the fuel channel, a catalytic reaction occurs for generating electric current.

These and other objectives of the present invention will no doubt become obvious to those of ordinary skill in the art after reading the following detailed description of the preferred embodiment that is illustrated in the various figures and drawings.

DETAILED DESCRIPTION

The present invention relates to a flow board of a fuel cell utilizing gaseous or liquid fuel. The flow board has one or more reaction zones. The methanol fuel flows and reacts to generate electric current after the MEA is laminated on and affixed to the flow board.

The flow board of the fuel cell in the present invention is an equipment reacted hydrogen or hydrogen compound with a catalyst, and the chemical energy changes to electric power. The flow board of the present invention is provided for the proton exchange membrane fuel cell used in portable electric products. It needs to be light, thin, and small, and to resist the chemical corrosion of the gaseous/liquid fuel and its reactant, and has superior mechanical properties.

Figure 1:
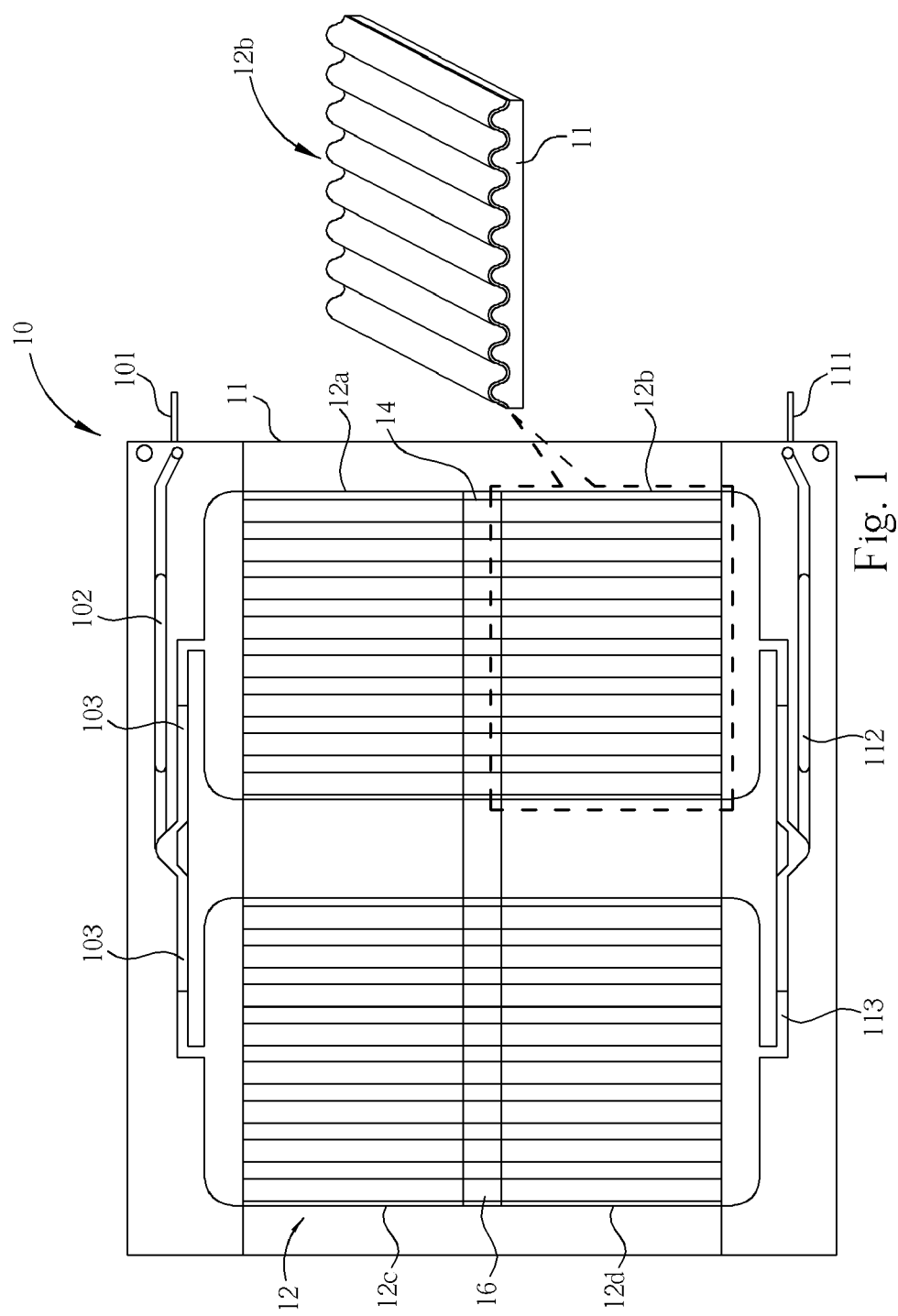
FIG. 1 illustrates a top view schematic diagram of a flow board according to the embodiment of the present invention.

Please refer to FIG. 1, which illustrates a top view schematic diagram of a flow board according to the embodiment of the present invention. As FIG. 1 shows, the flow board 10 of the present invention includes a body substrate 11, and at least a wave-shaped reaction zone 12. Take four wave-shaped reaction zones 12a, 12b, 12c, and 12d in FIG. 1 as an example. The lateral view of reaction zone 12b is the right diagram in FIG. 1. The fuel channels of reaction zones 12a, 12b, 12c, and 12d have the same flowing direction, from top to bottom or from bottom to top. The fuel channels of the reaction zones 12a and 12b interflow with each other. The fuel channels of the reaction zones 12c and 12d also interflow with each other. A crossing zone 14 is between the reaction zones 12a and 12b. A crossing zone 16 is between the reaction zones 12c and 12d.

The present invention does not limit one surface of the body substrate 11 to have the wave-shaped reaction zone. The other surface of the body substrate 11 could have the same wave-shaped reaction zone. Therefore, the present invention can apply to fuel channels on a single surface, or fuel channels on double surfaces.

As FIG. 1 shows, the body substrate 11 has a fuel inlet 101, input fuel channel 102, and manifold 103 at one end for injecting fuel. The fuel, such as methanol, flows into independent fuel channels of the reaction zone 12a, and 12c through the fuel inlet 101, input fuel channel 102, and manifold 103, and then flows into the reaction zones 12a and 12c, which are connected with the reaction zones 12b and 12d, respectively. Finally, the fuel flows out through the output fuel channels 112, and 113, and a fuel outlet 111.

One kernel feature of the present invention is that the fuel channels of reaction zones 12a, 12b, 12c, and 12d have the same flowing direction, e.g. from top to bottom or from bottom to top. The reaction zones 12a and 12b connect with each other, and the reaction zones 12c and 12d connect with each other. Each fuel channel of the reaction zones 12a, 12b, 12c, and 12d is independent from others to provide smooth and uniform flow.

According to the preferred embodiment of the present invention, the body substrate 11 of the flow board is made by injection molding methods with injection moldable polymer materials, which are able to be molded utilizing said injection molding methods, such as polyetheretherketone (PEEK), polyetherketoneketone (PEKK), Polysulfone (PSU), liquid crystal polymer (LCP), polymer plastic substrate or a compound of engineering plastic.

Please note that not every injection moldable polymer materials that can be molded by injection molding method can form the body substrate 11 of the flow board in the present invention. Take ABS resin, PP resin, and polycarbonate (PC) for example. These substances can be molded by injection molding methods, but they cannot resist methanol and do not have superior mechanical properties, so they are unsuitable. Therefore, the suitable materials are those listed in the above paragraph, with PSU being particularly suitable.

The above-mentioned injection moldable polymer materials could be further injected concurrently with filler. The above-mentioned filler could be a modifier, floating agent, mold-release agent etc.

The embodiment of forming the flow board of the present invention is illustrated by the following example (the material of the flow board is PSU in the example).

The injection molding method of forming the flow board of the present invention includes three basic steps: melting, floating, and solidifying. The powder PSU is melted to a liquid state by heating. Then, the melted PSU is injected into the mold, and cools down to become solid. The whole process is fast and automatic, and is especially suitable for mass production.

(1) Melting: the powder PSU is deformed under heat and pressure.

(2) Floating: the deformed PSU is filled in the whole mold under pressure.

(3) Solidifying/cooling: Once the PSU is cooled down it will be taken out.

Figure 2:
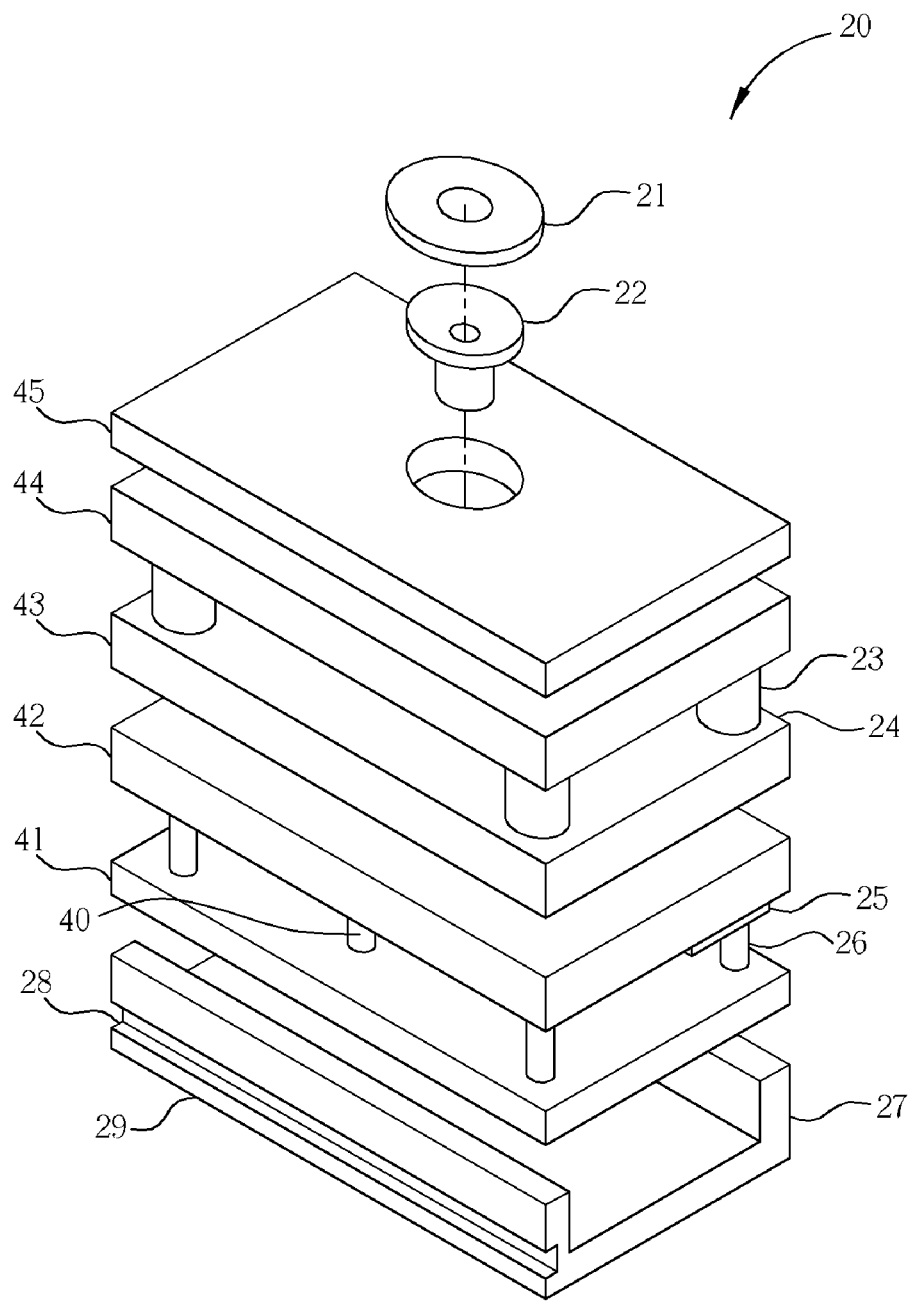
FIG. 2 illustrates a decomposed schematic diagram of the mold of the present invention.

FIG. 2 illustrates a decomposed schematic diagram of the mold 20 of the present invention. The mold 20 of the present invention includes a positioning ring 21, an injection brushing 22, guide pins 23, a membrane 24, an ejection plate 25, an ejection pin 26, a C stick 27, a groove 28, an ejection cover 29, an injection injector 40, an injection fixed plate 41, a support plate 42, a B board 43, an A board 44, and a top plate 45. Please note that the present invention is not limited to the above-mentioned mold.

The wave-shaped reaction zone 12 of the present invention and the body substrate 11 could be made monolithic at the same time. Furthermore, the wave-shaped reaction zone 12 could also be made in other ways. For example, a current collector plate defines fuel channels. The current collector plate is then combined with the body substrate 11 that is made by the injection molding methods.

Figure 3:
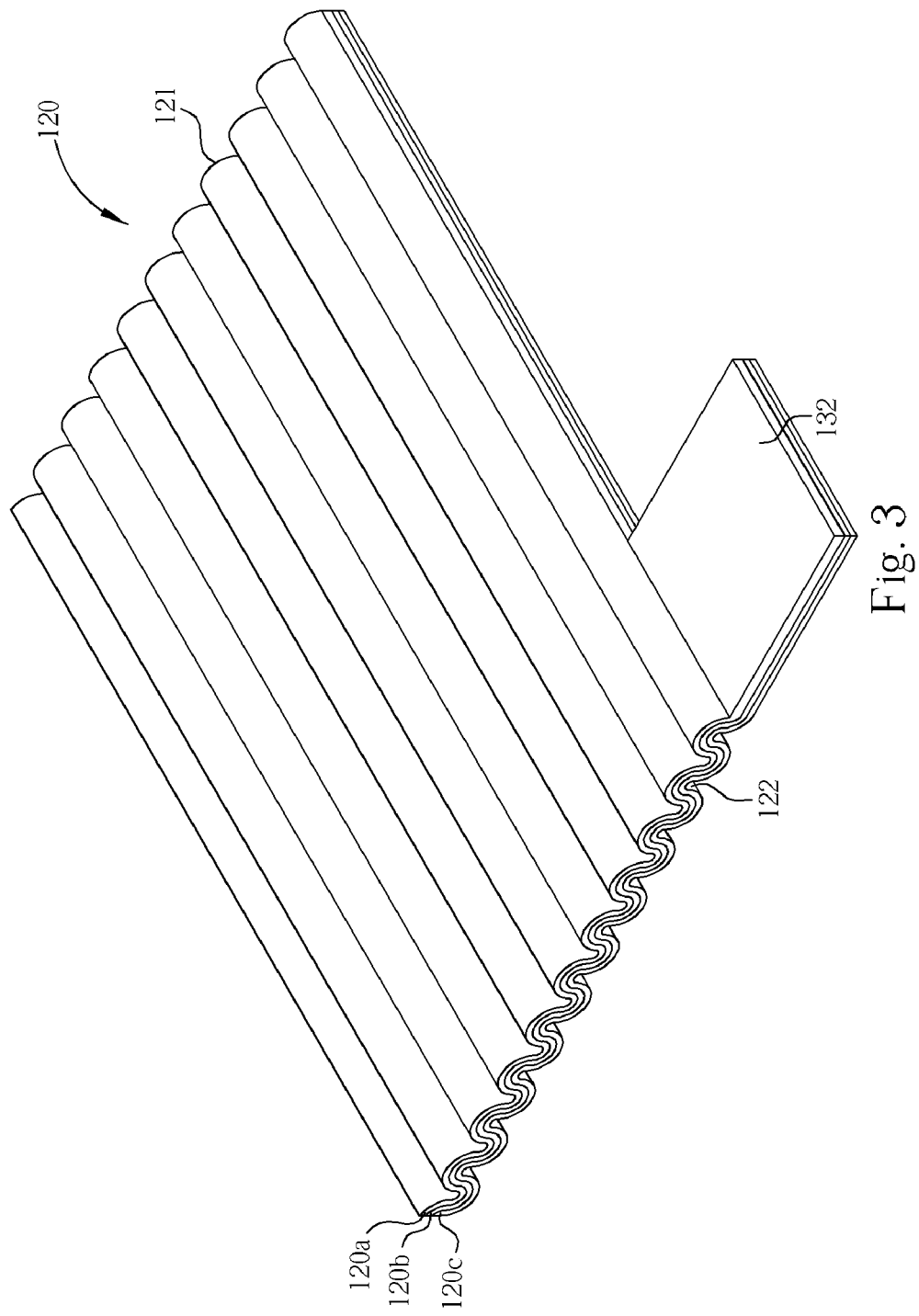
FIG. 3 illustrates a schematic diagram of a current collector, which defines wave-shaped fuel channels according to another embodiment of the present invention.

Please refer to FIG. 3, which illustrates a schematic diagram of a current collector 120, which is defined as a wave-shaped fuel channel according to another preferred embodiment of the present invention. In the embodiment, the current collector (anode) 120 is made from stainless steel or metal materials that are able to resist chemical corrosion from gaseous/liquid fuel of the fuel cell, such as the thin substrate 120a made by SUS316, SUS316L, SUS304, SUS304L, and titanium (Ti) alloy, and are made by a stamping process to form the wave-shaped fuel channels.

As shown in FIG. 3, the front surface 121 of the current collector 120 is formed by a plurality of independent wave-shaped fuel channels utilizing the stamping process for ensuring that the gaseous/liquid fuel flows smoothly. If the substrate 120a is made from stainless steel, which has higher resistance, the back 122 of the current collector 120 could be plated with a copper film 120b to decrease electrical resistance. An electro-coating paint or so-called ED paint 120c can cover and isolate the copper film 120b. The copper film 120b does not contact with the gaseous/liquid fuel of the fuel cell, such that the copper does not separate out or diffuse out to poison the fuel cell. The current collector 120 further includes a projective, bendable conductive lug portion 132. This connects electrically with the current collector 120 and the circuit of the cathode conductive plate, and allows electron output.

Figure 4:
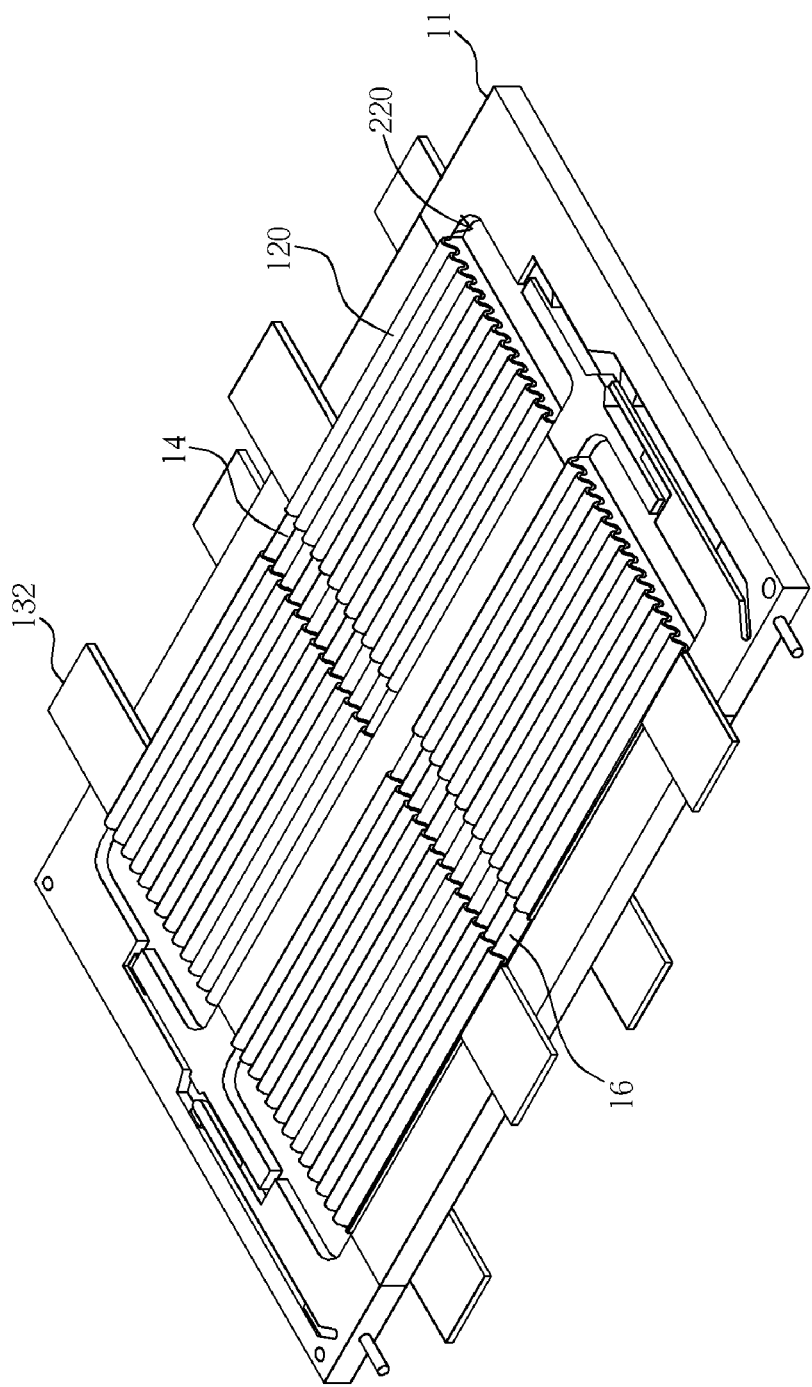
FIG. 4 illustrates a schematic diagram of the current collector of FIG. 3 mounted on a body substrate.

The current collector 120 of FIG. 3 is affixed to the body substrate 11 made by injection molding methods as shown in FIG. 4. The current collector 120 may be adhered to the body substrate 11 by epoxy AB glue or other types of epoxy resins. The current collector 120 could also be jammed or wedged into the body substrate 11 or fixed by screws. The current collector 120 is deposited in a corresponding recessed zone 220 provided by the body substrate 11. The shapes of the recessed zone and the current collector 120 are matched in order to save space.

In the direction of fuel channels, the crossing zones 14, and 16 are between the two adjacent current collectors 120. The fuel channels on the crossing zones 14, and 16 are monolithic with the body substrate 11, and connect with the corresponding fuel channels of the current collector 120. The conductive lug portion 132 is bended to connect electrically with the circuit of the body substrate 11. The conductive lug portion 132 can be connected in series or in parallel with the battery cells.

The current collector integrated on the body substrate 11 has at least the following advantages. First, the current collector could be made from stainless steel. Compared with the prior art, which uses gold, the present invention reduces cost. The stainless steel substrate forming the wave-shaped fuel channels by a stamping process is very simple and fast. Furthermore, the current collector 120 formed on the body substrate 11 could decrease the whole thickness of the fuel cell.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wave-shaped flow board suitable for a fuel cell, comprising:

an injection-molded body substrate made from injection moldable polymer materials wherein the injection moldable polymer materials comprise polyetheretherketone, polyetherketoneketone, liquid crystal polymer and their compounds;

at least a reaction zone recessed into a surface of the body substrate; and at least a wave-shaped current collector comprising a substrate made from stainless steel or other metal materials that are able to resist chemical corrosion from gaseous fuel of the fuel cell, which defines a plurality of independent fuel channels, the wave-shaped current collector being integrally mounted within the reaction zone and comprising a bendable conductive lug portion as an integral part of the wave-shaped current collector for providing an electrical connection between the wave-shaped current collector and a circuit on the surface of the wave-shaped flow board.

2. The wave-shaped flow board of claim 1, wherein the wave-shaped current collector further comprises a copper film plated on one surface of the substrate for decreasing electrical resistance of the wave-shaped current collector.

3. The wave-shaped flow board of claim 2, wherein the wave-shaped current collector further comprises an electro-coating paint covering the copper film to prevent the copper film from contacting with the fuel.

4. The wave-shaped flow board of claim 1, wherein the wave-shaped current collector is fixed in the reactive zone by epoxy AB glue or epoxy resin polymer adhesive.

5. The wave-shaped flow board of claim 1, wherein the wave-shaped current collector is wedged in the reactive zone.

* * * * *